US012457265B2

(12) United States Patent
Modadugu et al.

(10) Patent No.: US 12,457,265 B2
(45) Date of Patent: Oct. 28, 2025

(54) BLOCKCHAIN-ENABLED SHARING OF PRIVATE DATA

(71) Applicant: American Express Travel Related Services Company, Inc., New York, NY (US)

(72) Inventors: Rajendra Prasad Modadugu, Weston, FL (US); Jyothsna Nayak, Weston, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 129 days.

(21) Appl. No.: 18/394,671

(22) Filed: Dec. 22, 2023

(65) Prior Publication Data
US 2025/0211641 A1   Jun. 26, 2025

(51) Int. Cl.
*H04L 67/1097* (2022.01)
*H04L 67/51* (2022.01)

(52) U.S. Cl.
CPC .......... *H04L 67/1097* (2013.01); *H04L 67/51* (2022.05)

(58) Field of Classification Search
CPC ..................... H04L 67/1097; H04L 67/51
USPC ........................................................ 709/213
See application file for complete search history.

(56) References Cited

U.S. PATENT DOCUMENTS

| 11,063,770 | B1 * | 7/2021 | Peng | G06F 21/64 |
| 2020/0374132 | A1 * | 11/2020 | Lobban | G06Q 10/00 |
| 2022/0150072 | A1 * | 5/2022 | Jacob | H04L 63/123 |
| 2022/0321357 | A1 * | 10/2022 | Omori | H04L 9/3263 |
| 2023/0132505 | A1 * | 5/2023 | Lee | H04L 9/3239 |
| | | | | 713/156 |
| 2024/0022908 | A1 * | 1/2024 | Baskaran | H04W 12/069 |

* cited by examiner

*Primary Examiner* — Wing F Chan
*Assistant Examiner* — Leon Y Tseng
(74) *Attorney, Agent, or Firm* — Thomas Horstemeyer, LLP

(57) ABSTRACT

Disclosed are various embodiments for utilizing a shared blockchain to facilitate collaboration between partner institutions in collecting customer information. To begin, a computing device can receive an identifier associated with a user and a partner institution. Then, the computing device can obtain, based at least in part on the identifier, at least a user decentralized identifier (user DID) associated with the user and a partner decentralized identifier (partner DID) associated with the partner institution. Next, the computing device can identify a blockchain based at least in part on the partner DID. The computing device can then determine user data from the blockchain based at least in part on the user DID. Finally, the computing device can send the user data to a processing service.

20 Claims, 5 Drawing Sheets

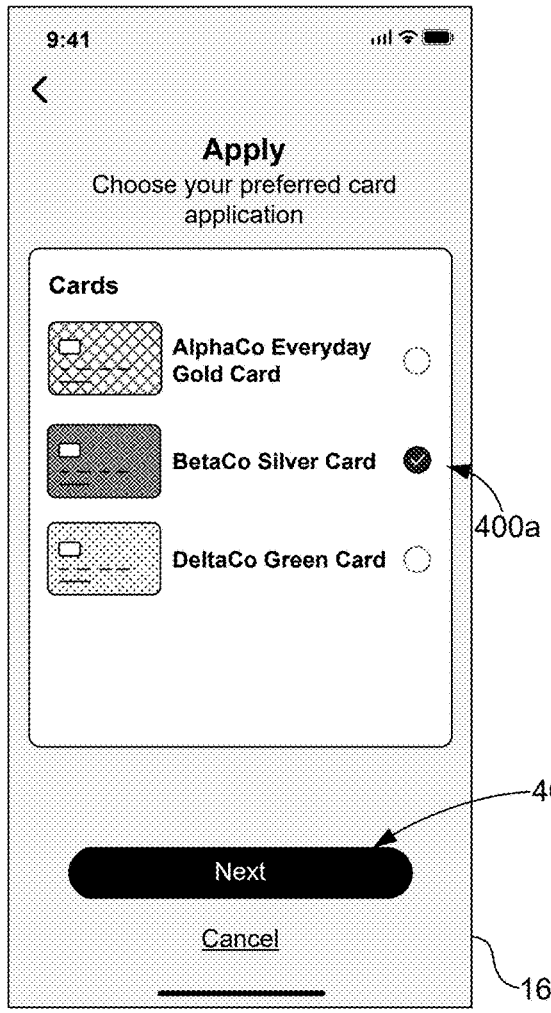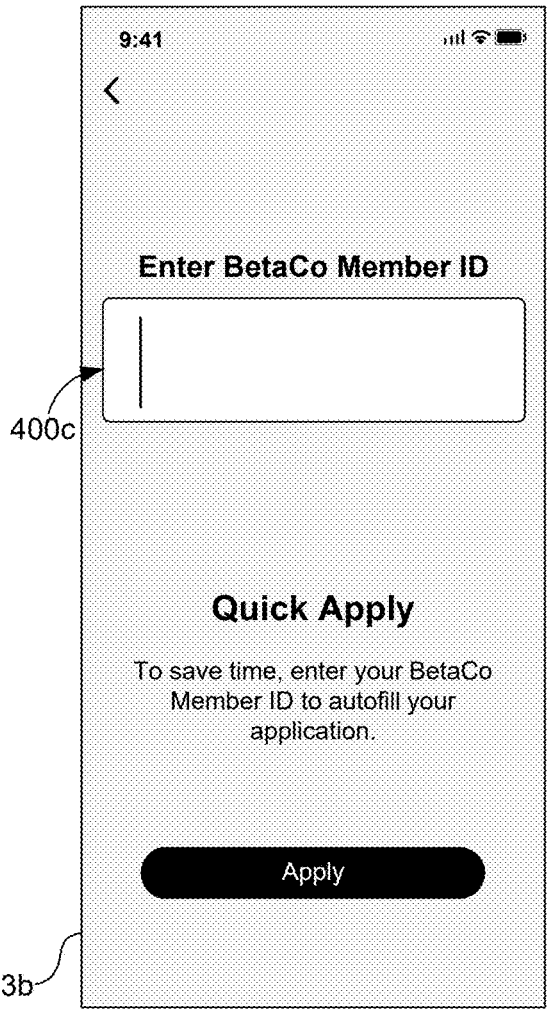
FIG. 4　　FIG. 5

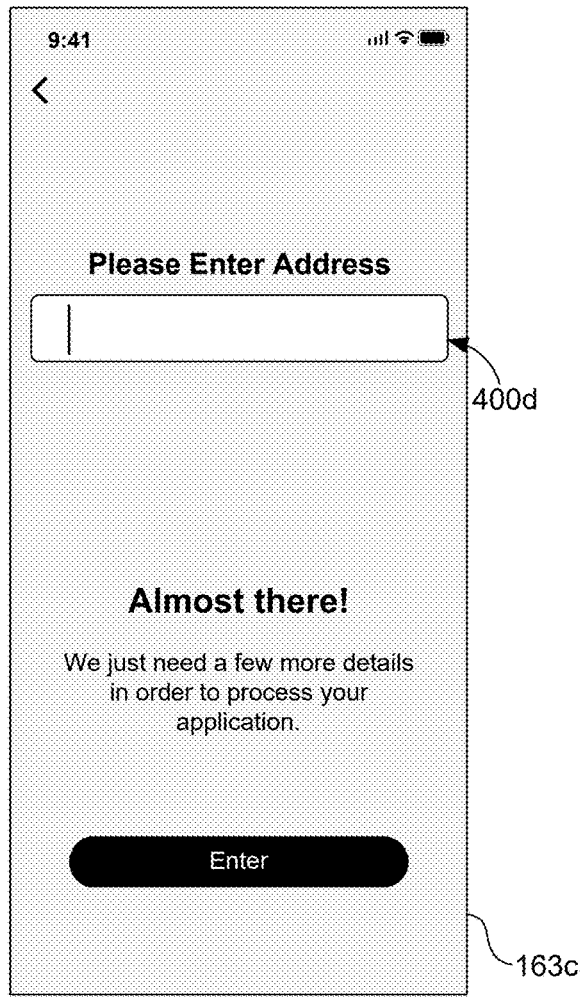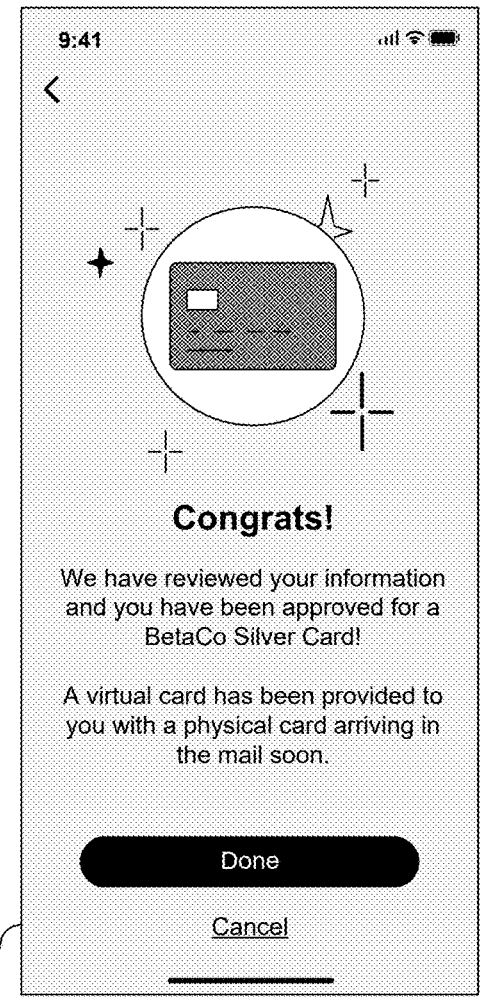
FIG. 6     FIG. 7

BLOCKCHAIN-ENABLED SHARING OF PRIVATE DATA

BACKGROUND

Many institutions collect information from their clients and customers as part of their daily operations. Multiple, different institutions will often collect the same information from their customers, requiring a customer to answer the same questions or provide the same information to numerous parties. When a customer has to provide the same information multiple times in a row for different institutions, this can become a cumbersome and taxing process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4-7 are user interface diagrams illustrating an example of a user experience according to various embodiments of the present disclosure.

DETAILED DESCRIPTION

Disclosed are various approaches for utilizing a shared blockchain to facilitate collaboration between partner institutions in collecting customer information. Many times, institutions who partner together to offer different goods or services collect much of the same information from shared clients or customers. For example, a financial institution may partner with a service-provider to offer a specially cobranded credit card or similar product or service. Both the financial institution and the service-provider will likely need to collect some of the same information from a customer who wishes to apply for the cobranded credit card. Currently, a customer applying for a cobranded credit card would need to first enter their information to complete a transaction with the service provider and then enter their information a second time to apply for the credit card. The ability to share customer information in a secure manner would save time for the customer as well as both institutions, since redundancies would be eliminated.

Accordingly, various embodiments of the present disclosure provide for blockchain-enabled collaboration on customer data between partner institutions. The use of a shared and private blockchain allows for customer information to be shared between collaborating institutions without reliance on duplicative data entries by a customer. Given the immutability of the blockchain as well as its decentralized and secure nature, customer data can be shared between institutions with little risk of tampering or unauthorized access. Additionally, the customer data can be represented by decentralized identifiers, or DIDs, for additional security.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
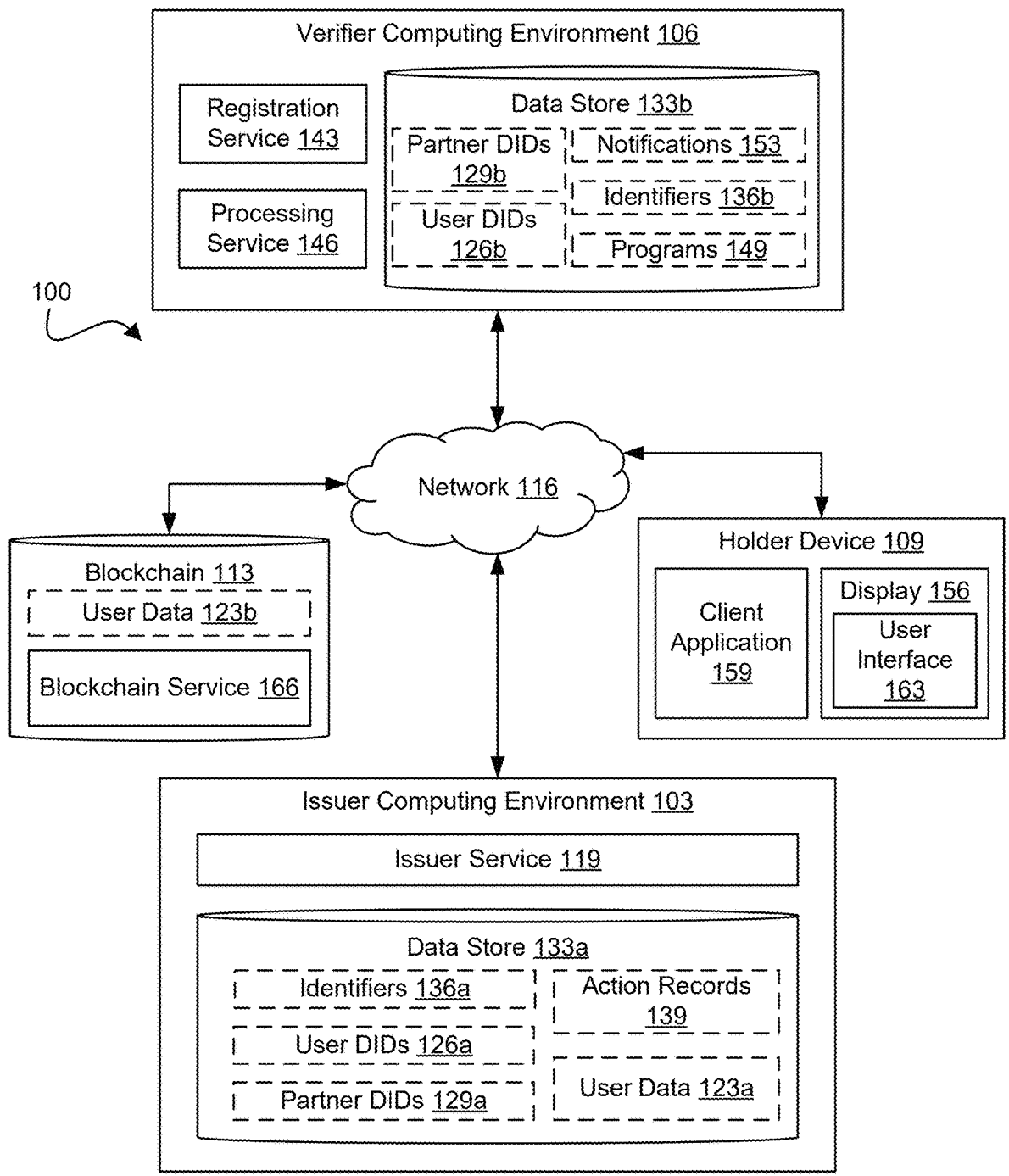
FIG. 1 is a drawing of a network environment according to various embodiments of the present disclosure.

With reference to FIG. 1, shown is a network environment 100 according to various embodiments. The network environment 100 can include an issuer computing environment 103, a verifier computing environment 106, a holder device 109, and a blockchain 113, each of which can be in data communication with each other via a network 116.

The network 116 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 116 can also include a combination of two or more networks 116. Examples of networks 116 can include the Internet, intranets, extranets, virtual private networks (VPNs), and similar networks.

The issuer computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the issuer computing environment 103 can employ a plurality of computing devices that can be arranged in one or more server banks or computer banks or other arrangements. Such computing devices can be located in a single installation or can be distributed among many different geographical locations. For example, the issuer computing environment 103 can include a plurality of computing devices that together can include a hosted computing resource, a grid computing resource, or any other distributed computing arrangement. In some cases, the issuer computing environment 103 can correspond to an elastic computing resource where the allotted capacity of processing, network, storage, or other computing-related resources can vary over time.

Various applications or other functionality can be executed in the issuer computing environment 103. The components executed on the issuer computing environment 103 include an issuer service 119, and other applications, services, processes, systems, engines, or functionality not discussed in detail herein.

The issuer service 119 can be executed to perform various actions. For instance, the issuer service 119 can be executed to obtain user data 123. The issuer service 119 can be executed to generate one or more DIDs to identify different aspects of the user data 123. For example, the issuer service 119 can generate a user DID 126 to represent the user associated with the user data 123. In addition, the issuer service 119 can generate a partner DID 129 to represent the partner institution (e.g., the issuer). The issuer service 119 can then be executed to write the user data 123 to the blockchain 113. Additional description of actions that can be executed by the issuer service 119 will be further described in the discussion of FIG. 2.

Also, various data is stored in a data store 133a that is accessible to the issuer computing environment 103. The data store 133a can be representative of a plurality of data stores 133a, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 133a is associated with the operation of the various applications or functional entities described below. This data can include user data 123a, user DIDs 126a, partner DIDs 129a, identifiers 136a, action records 139, and potentially other data.

The user data 123a can represent information about a user submitted to the issuer (also referred to herein as the "partner institution"). For example, the user data 123a can represent personal information associated with a user, such as a name, address, social security number (SSN), contact information, banking information, healthcare information (e.g., medical records, insurance information, etc.), transaction information (e.g., transaction history, payment instruments, confirmations, etc.), and other suitable user data 123a. The user data 123a can also include various other forms of data described herein, such as user DIDs 126, identifiers 136, etc. The user data 123a can be used to identify a person or entity associated with a user DID 126.

The user DIDs 126a can represent an identifier that enables verifiable, decentralized digital identity of a user. In some examples, the user DID 126a can be used to represent the identity of a user, a holder device 109 associated with the user, and other suitable subjects. In various examples, a user DID 126a can include an address to a user DID document on a distributed ledger that includes information associated with the subject (e.g., a user, a holder device 109, etc.). According to various embodiments, user DID documents can be hosted on any computing environment, such as the issuer computing environment 103, the verifier computing environment 106, the holder device 109, or any other computing environment. In such a situation, the user DID document can be shared peer-to-peer. In various examples, the user DID 126a can be implemented using various standards, such as a version of the World Wide Web Consortium's (W3C's) Decentralized Identifier (DID) standard. In at least some embodiments, the user DIDs 126a can be implemented as a peer DID. Peer decentralized identifiers (peer DIDs) are an extension of the traditional DID concept, such that it allows for the creation of DIDs without the need for an external blockchain or distributed ledger. Instead, peer DIDs are established and maintained directly between two or more parties, or peers, using a peer-to-peer (P2P) network. This approach eliminates the need for relying on a central registry or global consensus mechanism. Peer DIDs can be implemented using various standards, such as a version of the World Wide Web Consortium's (W3C's) peer DID method specification.

The partner DIDs 129a can represent an identifier that enables verifiable, decentralized digital identity of a subject (e.g., an entity, organization, institution, thing, etc.). In some examples, the partner DID 129a can be used to represent the identity of an issuing or partner institution, an issuer computing environment 103, and other suitable subjects. In various examples, a partner DID 129a can include an address to a partner DID document on a distributed ledger that includes information associated with the subject (e.g., a partner institution, an issuer computing environment 103, etc.). According to various embodiments, partner DID documents can be hosted on any computing environment, such as the issuer computing environment 103, the verifier computing environment 106, the holder device 109, or any other computing environment. In such a situation, the partner DID document can be shared peer-to-peer. In various examples, the partner DID 129a can be implemented using various standards, such as a version of the World Wide Web Consortium's (W3C's) Decentralized Identifier (DID) standard. In at least some embodiments, the partner DIDs 129a can be implemented as a peer DID. Peer DIDs can be implemented using various standards, such as a version of the World Wide Web Consortium's (W3C's) peer DID method specification. In such an embodiment, the one or more computing environments (e.g., issuer computing environment 103, verifier computing environment 106, etc.) can identify each other and share their respective partner DIDs 129a, as well as any other information, without having to involve a centralized repository, such as a distributed ledger.

The DID documents can include information associated with a subject (e.g., user, transaction, device, etc.). For example, the DID document can include a set of data describing the subject and can include various information (e.g., cryptographic keys) that can be used to identify and authenticate the subject. In at least one example, the DID document can include various public keys, such as a partner public key or an account public key. In various examples, the DID document can be implemented using various standards, such as the World Wide Web Consortium's (W3C's) Decentralized Identifier (DID) standard.

The identifiers 136a can be representative of a link or code with identifies a relationship between a partner institution and a user. In some embodiments, the identifier 136a can be an address (e.g., a web address/link, etc.), a matrix barcode (e.g., a Quick Response (QR) code), a barcode, a membership identification (e.g., account number, username, etc.), a transaction reference number (e.g., invoice number, booking number, reservation code, etc.), or other form of link or code which can be used to identify a relationship between a partner institution and a user. In some embodiments, the identifiers 136a can be used to identify a user DID 126, a partner DID 129, or both.

The action records 139 can be representative of receipts, reservations, confirmations, tickets, account records, or other records of actions between a partner institution and a user. In some embodiments, an action record 139 can include or otherwise be associated with an identifier 136. Action records 139 can include or otherwise be associated with a user DID 126, a partner DID 129, or both.

The verifier computing environment 106 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the verifier computing environment 106 can employ a plurality of computing devices that can be arranged in one or more server banks or computer banks or other arrangements. Such computing devices can be located in a single installation or can be distributed among many different geographical locations. For example, the verifier computing environment 106 can include a plurality of computing devices that together can include a hosted computing resource, a grid computing resource, or any other distributed computing arrangement. In some cases, the verifier computing environment 106 can correspond to an elastic computing resource where the allotted capacity of processing, network, storage, or other computing-related resources can vary over time.

Various applications or other functionality can be executed in the verifier computing environment 106. The components executed on the verifier computing environment 106 include a registration service 143, a processing service 146, and other applications, services, processes, systems, engines, or functionality not discussed in detail herein.

The registration service 143 can be representative of a service which can be configured to register a user for a program 149 offered by the verifier. In some embodiments, the registration service 143 can facilitate communications and data flow between the various applications and services in the network environment 100 to register the user. The registration service 143 can be executed to perform various actions. For instance, the registration service 143 can be executed to receive a registration request from a user, request the necessary information to identify the partner institution and the relevant blockchain 113, and read the relevant user data 123 from the blockchain 113. The registration service 143 can be configured to use an identifier 136 to determine a user DID 126 and a partner DID 129. Then, the registration service 143 can use the partner DID 129 to identify the blockchain 113 shared by the issuer and the verifier. Once the blockchain 113 has been identified, the registration service 143 can use the user DID 126 to identify and read the relevant user data 123 from the blockchain 113. The registration service 143 can perform other various embodiments in addition to these functions, some examples of which are described in detail herein. For example, additional description of actions that can be executed by the registration service 143 will be further described in the discussion of FIGS. 2 and 3.

The processing service 146 can be representative of any data evaluation tool used to process the user data 123 obtained from the blockchain 113. In some embodiments, the processing service 146 comprises an underwriting service for a financial institution or another form application processing service for an institution. The processing service 146 can be executed to perform various functions. The processing service 146 can be configured to receive the user data 123 from the registration service 143, evaluate the user data 123, and send results of the evaluation back to the registration service 143. Additional description of actions that can be executed by the processing service 146 will be further described in the discussion of FIGS. 2 and 3.

Also, various data is stored in a data store 133b that is accessible to the issuer computing environment 103. The data store 133b can be representative of a plurality of data stores 133b, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 133b is associated with the operation of the various applications or functional entities described below. This data can include user DIDs 126b, partner DIDs 129b, identifiers 136b, programs 149, notifications 153, and potentially other data. User DIDs 126b can be otherwise identical to the user DIDs 126a, except stored in data store 133b rather than data store 133a. Partner DIDs 129b can be otherwise identical to the partner DIDs 129a, except stored in data store 133b rather than data store 133a. Identifiers 136b can be otherwise identical to identifiers 136a, except stored in data store 133b rather than data store 133a.

Programs 149 can be representative of a membership program, an account, a financial plan or offer, or other program offered by the verifier institution for which the user wishes to register. Programs 149 can include program data representing all qualifications, requirements, benefits, or other data associated with the program 149. In some embodiments, program data can include requirements for user data 123 necessary to determine enrollment eligibility. These requirements can include requirements for the category of user data 123 as well as requirements for the specifics of the user data 123 within that category.

Notifications 153 can be representative of messages sent and received by the various services in the network environment 100. Notifications 153 can include prompts for information, alerts, messages, requests, and confirmations exchanged between the various services. In some embodiments, the notifications 153 are generated by one service based at least in part on data received from another service. In some embodiments, the notifications 153 can be representative of templates which can be sent as forms or modified based at least in part on incoming data.

The holder device 109 is representative of a plurality of client devices that can be coupled to the network 116. The holder device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The holder device 109 can include one or more displays 156 such as liquid crystal displays (LCDs), gas plasma-based flat panel displays, organic light emitting diode (OLED) displays, electrophoretic ink ("E-ink") displays, projectors, or other types of display devices. In some instances, the display 156 can be a component of the holder device 109 or can be connected to the holder device 109 through a wired or wireless connection.

The holder device 109 can be configured to execute various applications such as a client application 159 or other applications. The client application 159 can be executed in a holder device 109 to access network content served up by the issuer computing environment 103, the verifier computing environment 106, or other servers, thereby rendering a user interface 163 on the display 156. To this end, the client application 159 can include a browser, a dedicated application, or other executable, and the user interface 163 can include a network page, an application screen, or other user mechanism for obtaining user input. The holder device 109 can be configured to execute applications beyond the client application 159 such as email applications, social networking applications, word processors, spreadsheets, or other applications. Additional description of actions that can be executed by the client application 159 will be further described in the discussion of FIG. 3.

The blockchain 113 can represent an immutable, append only, eventually consistent distributed data store formed from a plurality of nodes in a peer-to-peer network that maintain duplicate copies of data stored in the blockchain 113. The nodes of the blockchain 113 can use a variety of consensus protocols to coordinate the writing of data written to the blockchain 113. In order to store or retrieve data to/from the blockchain 113, a blockchain service 166 can be used.

Individual nodes of the blockchain 113 can host a blockchain service 166. The blockchain service 166 can be configured to receive requests from other computing devices (e.g., from the issuer computing environment 103, the verifier computing environment 106, various holder devices 109, etc.) and respond to the requests. For example, the blockchain service 166 could receive a request from a computing device to write data to the blockchain 113. In response, the blockchain service 166 could write the data to the blockchain 113 and verify that other nodes of the blockchain 113 also wrote the data to the blockchain 113. As another example, the blockchain service 166 could receive a request from a computing device to read data from the blockchain 113. In response, the blockchain service 166 could search the blockchain 113 and return the requested information from the blockchain 113. Other operations could also be performed by the blockchain service 166 in various embodiments of the present disclosure.

Blockchains may be public or private. A public blockchain is a blockchain 113 that is accessible and available to anyone who operates a node, client, or other application configured to connect to or participate in the public blockchain. A private blockchain, sometimes referred to as a permissioned blockchain, is a blockchain 113 where participation is limited to authorized or permitted participants. A private blockchain can be used in situations where the advantages of an immutable, append only, eventually consistent distributed data stores formed from a plurality of nodes in a peer-to-peer network that maintain duplicate copies of data is desired, but public or unrestricted access to the data is not desired. Examples of public blockchain include the BITCOIN network, the ETHEREUM network, the SOLANA network, etc. Examples of a private blockchain include sidechains to the BITCOIN network or ETHEREUM network, as well as HYPERLEDGER or similar systems. In some embodiments, the blockchain 113 is a private blockchain accessible only to the issuer and the verifier.

Next, a general description of the operation of the various components of the network environment 100 is provided. To begin, a user can complete an action with an issuer institution. This action can be setting up an account with the issuer, making a purchase, booking a service, or otherwise providing user data 123 to the issuer institution. In providing this user data 123, the user can also provide consent to share the user data 123 with partner institutions such as the verifier institution. Once the user has provided user data 123 and consent to the issuer institution, the issuer service 119 can assign an identifier 136 to the user data 123. In addition, the issuer service 119 can generate a user DID 126 associated with the user, a partner DID 129 associated with the issuer institution itself, and various other DIDs or identifiers to identify the user data 123. The issuer service 119 can send the user data 123 to the blockchain service 166 to be written to a blockchain 113 shared with one or more partner verifier institutions.

As part of the action or as a separate event, the verifier can make a registration offer to the user for a program 149. In some embodiments, the registration offer is made by the issuer on behalf of the verifier. In some embodiments, the registration offer comprises an advertisement which directs the user to make a registration request. The user can respond to the registration offer by making a registration request with the client application 159. According to various examples, the user can initiate the registration by sending an identifier 136 associated with the issuer institution to the verifier institution to request a registration offer. The registration service 143 of the issuer can receive the identifier 136 and determine the user DID 126 and the partner DID 129 based at least in part on the identifier 136. According to various examples, the registration service 143 can use information associated with the identifier 136 to identify one or more programs 149 suited to the user and send a registration prompt to the user. In some embodiments, the user can respond to the registration prompt with a registration request via the client application 159.

Once the user has initiated the registration process with the registration service 143, the registration service 143 can be configured to identify the blockchain 113 corresponding to the partner DID 129 and determine the user data 123 from the blockchain 113. In some embodiments, the registration service 143 can obtain the user data 123 from the blockchain 113 and compare it to the program 149 to determine if the user data 123 meets all the requirements for the program 149. If the registration service 143 determines that the user data 123 obtained from the blockchain 113 does not meet all the requirements of the program 149, the registration service 143 can generate a prompt asking for the additional data needed to satisfy the requirements of the program 149 and send the prompt to the client application 159. Once the registration service 143 has all the required user data 123, the registration service 143 can send the user data 123 to the processing service 146 for evaluation. The processing service 146 can evaluate the user data 123 and return an approval or denial of the registration request.

Figure 2:
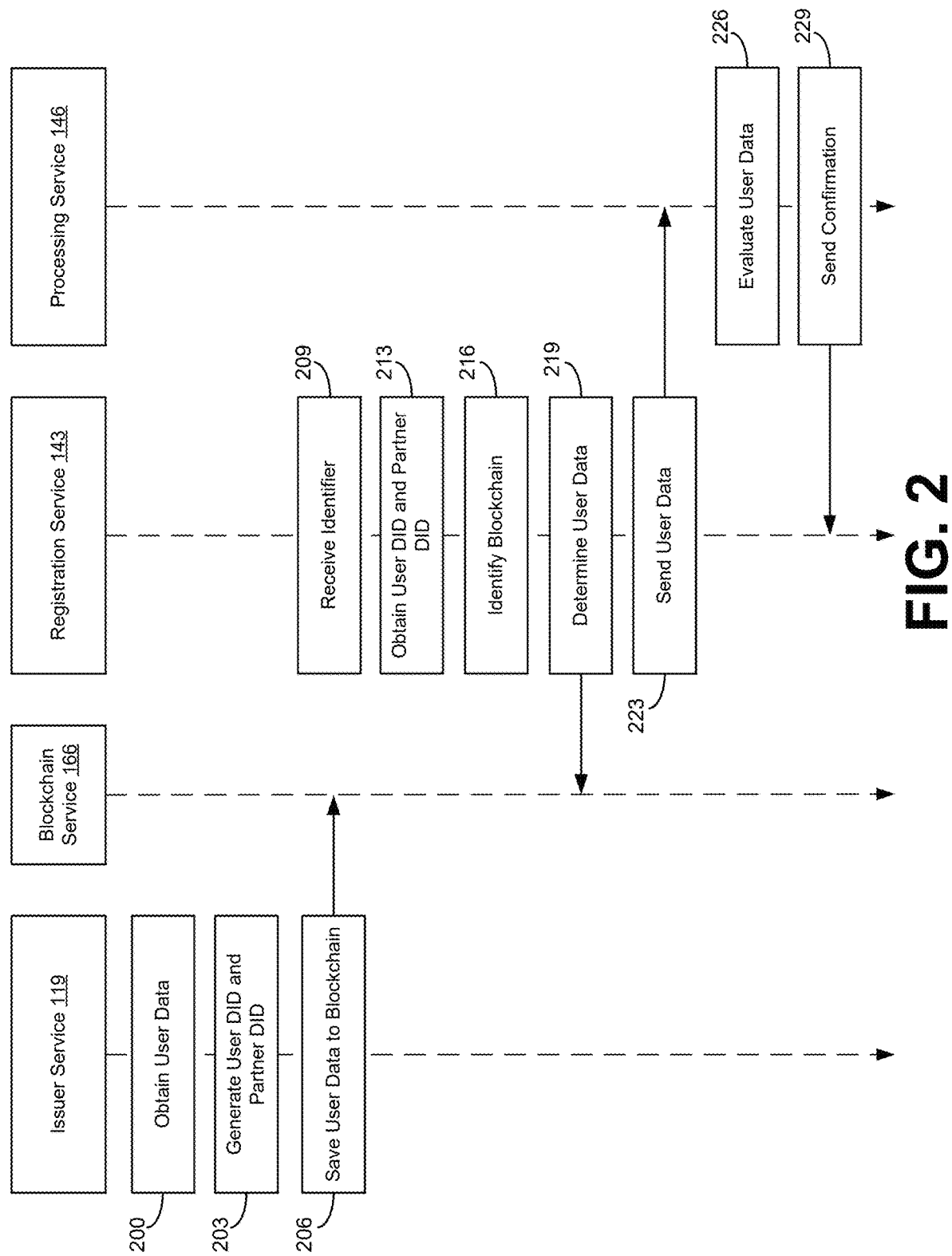
FIG. 2 is a sequence diagram illustrating interactions between various components of the network environment of FIG. 1 according to various embodiments of the present disclosure.

Referring next to FIG. 2, shown is a sequence diagram that provides one example of the interactions between the issuer service 119, the blockchain service 166, the registration service 143, and the processing service 146. The sequence diagram of FIG. 2 provides merely an example of the many different types of functional arrangements that can be employed to implement the operations of the depicted portions of the issuer service 119, the blockchain service 166, the registration service 143, and the processing service 146. As an alternative, the sequence diagram of FIG. 2 can be viewed as depicting an example of elements of a method implemented within the network environment 100.

Beginning with block 200, the issuer service 119 can be executed to obtain user data 123. User data 123 can be obtained from a data store 133, received from a client application 159 of a user, or from another system, service, or application in the network environment 100. The user data 123 can be obtained in association with an action between the user and the issuer institution.

Next, at block 203, the issuer service 119 can be executed to generate a user DID 126 and a partner DID 129. The user DID 126 and the partner DID 129 can be generated separately and independently or concurrently depending on various factors.

To generate a user DID 126, the issuer service 119 can first generate a user DID document that includes various user data 123 obtained at block 200, as well as other information, such as the identity of the holder device 109 associated with the user, or information relating to another suitable subject. The user DID document can also include a user public key that is publicly accessible and associated with the user. The user DID document can be stored in the issuer computing environment 103, or other computing environment. Once the user DID document has been generated, the user DID 126 can be generated to reference the user DID document according to at least one of the World Wide Web Consortium's (W3C's) Decentralized Identifier (DID) standard or the Identity Foundation's peer DID standard.

Similarly, to generate a partner DID 129, the issuer service 119 can first generate a partner DID document that includes various data associated with the issuer or partner institution, such as the identity or address of the issuer computing environment 103, or information relating to another suitable subject. The partner DID document can also include a user public key that is publicly accessible and associated with the partner/issuer institution. The partner DID document can be stored in the issuer computing environment 103, or another computing environment. Once the partner DID document has been generated, the partner DID 129 can be generated to reference the partner DID document according to at least one of the World Wide Web Consortium's (W3C's) Decentralized Identifier (DID) standard or the Identity Foundation's peer DID standard. In some embodiments, the issuer service 119 can generate the partner DID 129 specific to the action between the user and the issuer. In some embodiments, the issuer service 119 can use a pre-existing partner DID 129 to associate with the user data 123 instead of generating a new partner DID 129. In various examples, the issuer service 119 can implement the user DID 126 and the partner DID 129 as peer DIDs using various standards, such as a version of the World Wide Web Consortium's (W3C's) peer DID method specification.

At block 206, the issuer service 119 can be executed to save the user data 123 to the blockchain 113. In some embodiments, the issuer service 119 sends a write request to the blockchain service 166 to have the user data 123 written to the blockchain 113. According to various examples, the issuer service 119 saves the user data 123 to the blockchain 113 in the form of a DID. The issuer service 119 can encrypt the user data 123 before saving the user data 123 to the blockchain 113.

At block 209, the registration service 143 can be executed to receive an identifier 136. In some embodiments, the registration service 143 receives an identifier 136 from a client application 159, described in further detail in the discussion of block 300 of FIG. 3. In some embodiments, the registration service 143 can receive or obtain the identifier 136 from another system, service, or application in the network environment 100. The identifier 136 can be received by the registration service 143 in the form of a link or an address to computing environment or a data store 133 where various information associated with the identifier 136 is stored.

Next, at block 213, the registration service 143 can obtain the user DID 126 and the partner DID 129. The registration service 143 can obtain the user DID 126 and the partner DID 129 based at least in part on the identifier 136 received at block 209. In some embodiments, the identifier 136 references data stored on a server in the network environment 100 where the user DID 126 and the partner DID 129 can be obtained. In some embodiments, the identifier 136 can be used to identify a user account which the user has with the issuer, where the user account includes at least the user DID 126 and the partner DID 129.

At block 216, the registration service 143 can be executed to identify the blockchain 113. In some embodiments, the registration service 143 can use the partner DID 129 obtained at block 213 to determine a peer partner DID associated with the partner DID 129. The peer partner DID can represent a peer DID which is privately shared between the issuer and the verifier. The registration service 143 can determine the peer partner DID from data associated with the public partner DID 129 obtained at block 213. In such embodiments, once the peer partner DID has been identified, the registration service 143 can identify the blockchain 113 associated with the peer partner DID. In some embodiments, the registration service 143 can select the blockchain 113 based at least in part on the peer partner DID. In some embodiments, the registration service 143 can select the blockchain 113 associated with the peer partner DID from a list of one or more blockchains associated with a variety of different partner institutions.

At block 219, the registration service 143 can be executed to determine the user data 123 from the blockchain 113. In some embodiments, the registration service 143 can determine the user data 123 by sending a read request to the blockchain service 166 for the user data 123 associated with the user DID 126 obtained at block 213. The registration service 143 can receive the user data 123 from the blockchain service 166 in response to sending the read request.

Then, at block 223, the registration service 143 can send the user data 123 to a processing service 146. In some embodiments, the registration service 143 sends the user data 123 determined at block 219 to the processing service 146. According to various examples, the registration service 143 can modify or add to the user data 123 obtained at block 219 before sending the modified user data 123 to the processing service 146, as described further in the discussion of FIG. 3. In some embodiments, the registration service 143 can send the user data 123 to a data store 133 accessible to the processing service 146, or to another system, service, or application in the network environment 100.

At block 226, the processing service 146 can be executed to evaluate the user data 123. The processing service 146 can receive the user data 123 sent from the registration service 143 at block 223. The processing service 146 can evaluate the user data 123 by comparing the user data 123 to a number of qualifications, criteria, or requirements. In some embodiments, the processing service 146 can represent an underwriting service which evaluates the user data 123 to determine creditworthiness based at least in part on a risk assessment.

Next, at block 229, the processing service 146 can send a confirmation to the registration service 143. The confirmation can be representative of a registration notification, indicating whether the user data 123 satisfies the criteria associated with the program 149 or fails to satisfy the criteria. The processing service 146 can use a notification 153 as a template to send the confirmation to the registration service 143. In some embodiments, the processing service 146 can send the confirmation to another system, service, or application in the network environment 100. After block 229, the sequence diagram of FIG. 2 comes to an end.

Figure 3:
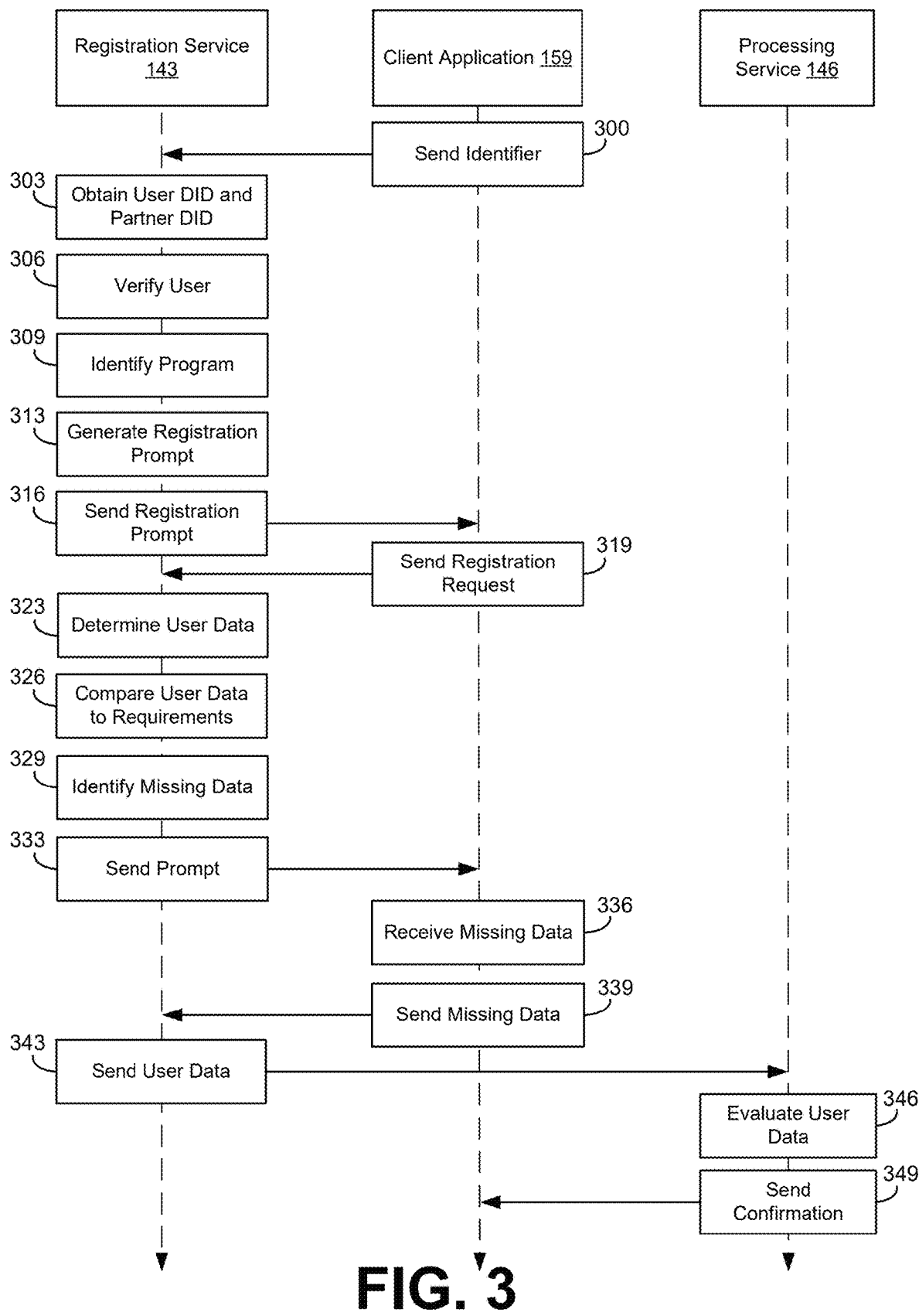
FIG. 3 is a sequence diagram illustrating interactions between various components of the network environment of FIG. 1 according to various embodiments of the present disclosure.

Moving next to FIG. 3, shown is a sequence diagram that provides one example of the interactions between the registration service 143, the client application 159, and the processing service 146. The sequence diagram of FIG. 3 provides merely an example of the many different types of functional arrangements that can be employed to implement the operations of the depicted portions of the registration service 143, the client application 159, and the processing service 146. As an alternative, the sequence diagram of FIG. 3 can be viewed as depicting an example of elements of a method implemented within the network environment 100.

Beginning with block 300, the client application 159 can be executed to send an identifier 136 to the registration service 143. The client application 159 can obtain the identifier 136 from data provided by a user via the user interface 163, as described in further detail in the discussion of FIG. 4. In some embodiments, the client application 159 sends the identifier 136 to the registration service 143 along with an initiation request to begin the registration process.

At block 303, the registration service 143 can obtain the user DID 126 and the partner DID 129. The registration service 143 can obtain the user DID 126 and the partner DID 129 based at least in part on the identifier 136 received from the client application 159 at block 300. In some embodiments, the identifier 136 references data stored on a server in the network environment 100 where the user DID 126 and the partner DID 129 can be obtained. In some embodiments, the identifier 136 can be used to identify a user account which the user has with the issuer, where the user account includes at least the user DID 126 and the partner DID 129.

At block 306, the registration service 143 can verify the user associated with the user DID 126. In some embodiments, the registration service 143 can verify the user associated with the user DID 126 based at least in part on a verifiable credential associated with the user DID 126. A verifiable credential can represent a credential issued by an issuer service 119 to the user and can be stored on the holder device 109. Verifiable credentials can be represented, for example, using JavaScript Object Notation (JSON) objects or files. A verifiable credential can include various fields or data, such as the issuer of the verifiable credential, the subject of the verifiable credential, the type of credential, etc. Fields such as those representing the issuer or subject of the verifiable credential could have a respective DID specified as the identifier of the issuer or subject. For example, a user DID 126 could be included in the verifiable credential to identify the user of the holder device 109 and a partner DID 129 could be included in the verifiable credential that identifies the issuer device or issuer service 119 that issued the verifiable credential. In some implementations, verifiable credentials could be implemented using a standard, such as a version of the W3C's "Verifiable Credentials Data Model." In some embodiments, the registration service 143 can use the verifiable credential to verify the identity of the user.

Next, at block 309, the registration service 143 can be executed to identify a program 149. The registration service 143 can use the identifier 136, user DID 126, partner DID 129, or other data associated with the user to determine one or more programs 149 for which the user is eligible. The registration service 143 can identify one or more programs 149 for which the user is eligible from a complete list of all programs being offered by the verifier institution. In some embodiments, the registration service 143 identifies a program 149 based at least in part on a promotion or other preferred program 149 applicable to the user based at least in part on the partner DID 129. The registration service 143 can identify a program 149 based at least in part on program data and, in some embodiments, based at least in part on user data 123, or other data. For example, the registration service 143 can determine the program 149 by comparing user data 123 to the program data associated with various programs 149 and select the program 149 with program data having the closest correspondence to the user data 123. In some examples, the registration service 143 can identify the preferred program 149 based at least in part on a message received from another system, service, or application in the network environment 100.

At block 313, the registration service 143 can generate a registration prompt. The registration prompt can be representative of an input, request, instruction, order, or other notification which can include program data associated with a preferred program 149. In some embodiments, the registration service 143 can send the program message to the client application 159, to a data store 133, or to another system, service, or application in the network environment 100. In some embodiments, the registration prompt is generated based at least in part on the program 149 identified at block 309. The registration service 143 can generate the registration prompt to include program data related to the program 149. In some embodiments, the registration prompt can include an offer for a user to apply for one or more different programs 149.

Then, at block 316, the registration service 143 can send the registration prompt generated at block 313 to the client application 159. The registration service 143 can send the registration prompt in response to identifying the program 149 at block 309, in response to receiving the identifier 136 from block 300, or in response to some other step or action. In some embodiments, the registration service 143 can send the registration prompt to another system, service, or application in the network environment 100.

At block 319, the client application 159 can send a registration request to the registration service 143. The client application 159 can use the registration prompt received from the registration service 143 at block 316 to generate a user interface 163 including information included in the registration request to a user. For example, the client application 159 can cause a message to be sent to the user interface 163 of the holder device 109 which asks a user if they would like to apply for a program 149. Examples of user interfaces 163 are discussed in further detail in the description of FIGS. 4 and 5. The client application 159 can then receive a selection from a user via an interaction with the user interface 163. The user interaction can comprise a selection of program 149 for which the user wants to register. However, other interactions could also initiate the registration request. The client application 159 can receive the selection of the program 149 and send a registration request including the selected program 149 to the registration service 143.

Next, at block 323, the registration service 143 can determine user data 123. The registration service 143 can be executed to determine the user data 123 from the blockchain 113. In some embodiments, the registration service 143 can determine the user data 123 by sending a read request to a blockchain service 166 for the user data 123 associated with the user DID 126 obtained at block 303. The registration service 143 can receive the user data 123 from the blockchain service 166 in response to sending the read request.

At block 326, the registration service 143 can be executed to compare the user data 123 to requirements of the applicable program 149. The registration service 143 can itemize the user data 123 into separate data elements and compare the list of separate data elements to a list of data requirements associated with the selected program 149 identified in the registration request received at block 319. In some embodiments, the registration service 143 can match each separate data element to a data requirement.

At block 329, the registration service 143 can be executed to identify missing data, or data which was not determined with the user data 123 at block 323 but is otherwise required for the selected program 149. Based at least in part on the user data 123 determined at block 323 and the program 149 identified in the registration request received at block 319, the registration service 143 can identify missing data which is necessary to complete registration. Using the comparison conducted at block 326, the registration service 143 can identify data requirements for the program 149 for which there is no corresponding user data 123. If each data requirement of the program 149 corresponds to a data element of the user data 123, then no missing data is identified, and the process moves to block 343. If there are one or more data requirements which do not have any corresponding data elements from the user data 123 determined at block 323, then the registration service 143 identifies these requirements as "missing data."

Continuing on to block 333, once the registration service 143 has identified missing data, the registration service 143 can send a prompt for the missing data to the client application 159. In some embodiments, the registration service 143 can generate a prompt based at least in part on using a notification 153 from a data store 133. The prompt can include a request for the missing data identified at block 329. In some embodiments, the registration service 143 can send the prompt for missing data to the client application 159 of the holder device 109, and the client application 159 can display a prompt for the missing data on the user interface 163. Examples of user interfaces 163 are discussed in further detail in the description of FIGS. 4 and 5.

Then, at block 336, the client application 159 can receive the missing data. In some embodiments, the client application 159 can receive or obtain the missing data based at least in part on an interaction with the user interface 163. In some embodiments, the client application 159 can receive the missing data from a data store 133, or other system, service, or application in the network environment 100.

At block 339, the client application 159 can be executed to send the missing data to the registration service 143. In some embodiments, the client application 159 can send the missing data in response to receiving the missing data at block 336. In some embodiments, the client application 159 can send the missing data in response to a request for the missing data from the registration service 143. According to various examples, the client application 159 can send the missing data to a data store 133 or other system, service, or application in the network environment 100.

At block 343, the registration service 143 can be executed to send the user data 123 to the processing service 146. The registration service 143 can combine the missing data received at block 339 with the user data 123 determined at block 323 to make a complete set of user data 123. In some embodiments, the complete user data 123 can be sent to the processing service 146 along with a request to evaluate the user data 123 based at least in part on the program 149. The registration service 143 can send the user data 123 with the program 149 identified at block 309. In some embodiments, the registration service 143 can send the user data 123 to a data store 133 or other system, service, or application in the network environment 100.

Next, at block 346, the processing service 146 can be executed to evaluate the user data 123. The processing service 146 can receive the user data 123 sent from the registration service 143 at block 343. The processing service 146 can evaluate the user data 123 by comparing the user data 123 to a number of qualifications, criteria, or requirements from the program 149 identified at block 309. In some embodiments, the processing service 146 can represent an underwriting service which evaluates the user data 123 to determine creditworthiness based at least in part on a risk assessment. In some embodiments the processing service 146 can evaluate the user data 123 in response to receiving the user data 123.

At block 349, the processing service 146 can send a confirmation, or registration notification, to the client application 159. The processing service 146 can use a notification 153 as a template to send the confirmation to the client application 159. The client application 159 can send the confirmation to a user interface 163 to inform a user that their registration was successful. In some embodiments, the processing service 146 can send the confirmation to another system, service, or application in the network environment 100. After block 349, the sequence diagram of FIG. 3 comes to an end.

FIGS. 4 and 5 are user interface 163 diagrams illustrating an example of a user experience according to the previously described embodiments of the present disclosure. Specifically, the user interfaces 163*a* . . . 163*d* (collectively, "user interfaces 163") of FIGS. 4 and 5 can be generated by the client application 159 and presented to a user using the display 156 of the holder device 109 as can be appreciated.

Beginning with FIG. 4, an example of a user interface 163*a* is illustrated for presenting a user with one or more programs 149 for which to apply. According to various nonlimiting examples, the user journey can begin with the user engaging in a transaction with a partner/issuer institution. The partner institution and the verifier institution, having a pre-existing relationship, can present an offer to the user to register for a program 149 offered by the verifier institution. In some embodiments, the offer can be made at the time of the transaction. However, in various other embodiments, the offer can be made at another time. If the user wishes to participate in the program 149, the user can interact with the offer to be directed to the user interface 163*a* of FIG. 4.

The user interface 163*a* can include a plurality of user interface elements 400*a* . . . 400*d* which can be selected, manipulated, or otherwise interacted with by the user. For example, the user could be presented with multiple programs 149 or, as depicted in FIG. 4, credit card applications from which to choose, such as the "AlphaCo Everyday Gold Card," and so forth. The programs 149 identified by the registration service 143 described above can be presented in the user interface 163*a* along with a user interface element 400*a* which can be used by the user to make a selection of a program 149. The program 149 selected can be used to compare the user data 123 to identify missing data and to evaluate the user data 123 for eligibility, as described previously.

Referring now to FIG. 5, another example of a user interface 163*b* is illustrated for obtaining an identifier 136 from a user. The client application 159 can generate the user interface 163*b* in response to receiving a user interaction with the user interface elements 400*a* and 400*b* on the user interface 163*a*. The user interface 163*b* can include a user interface element 400*b* which can be representative of a text input where the user can type a code, number, username, or other alphanumeric which represents the identifier 136. In some embodiments, the user interface element 400*c* can link to a camera application for scanning a barcode, a matrix code, or other form of scannable identifier 136. By providing the identifier 136, the user can initiate the process previously described in the sequence diagram of FIG. 3.

Moving to FIG. 6, another example of a user interface 163*c* is illustrated for prompting the user to provide missing data. After the user has provided an identifier 136 by interacting with the user interface element 400*b* of user interface 163*b*, the client application 159 can generate user interface 163*c* in response to receipt of a prompt for missing data from the registration service 143. As described previously, in some embodiments, the user data 123 obtained from the blockchain 113 is incomplete compared to the data requirements of the program 149. In such circumstances, one or more systems, services, or applications can work in conjunction with one another to identify which data requirements are unmet (referred to as "missing data"), generate a prompt for the missing data, and cause the user interface 163*c* to be displayed having a user interface element 400*d* which can be used to obtain the relevant missing data. In some embodiments, the user interface element 400*d* can be representative of a text input where the user can type responses to prompts for the missing data. In some embodiments, the client application 159 does not receive a prompt for missing data from the registration service 143, and the user interface 163*c* is skipped in the example user journey.

Finally, at FIG. 7, another example of a user interface 163*d* is illustrated for presenting a registration confirmation or notification. The user interface 163*d* can be presented after user interface 163*b* or after 163*c*, according to various embodiments. After the user has entered their identifier 136 at user interface 163*b*, or in some embodiments, entered their missing data at user interface 163*c*, the client application 159 can communicate with the registration service 143 and the processing service 146 to determine whether the user is approved for the program 149 selected at user interface 163*a*. As described previously, once the user data 123 has undergone evaluation by the processing service 146 and has been approved for the program 149, a registration confirmation can be sent to the client application 159. The client application 159 can generate the user interface 163*d* based at least in part on the registration confirmation. In some embodiments, the user data 123 fails to meet the requirements under the evaluation by the processing service 146. In such embodiments, the user interface 163*d* can present a registration denial or other message, notification, alert, etc. The user can interact with various user interface elements 400 to complete another application for a different program 149, cancel their application, or end the process.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        receive an identifier associated with a user and a partner institution;
        obtain, based at least in part on the identifier, at least a user decentralized identifier (user DID) associated with the user and a partner decentralized identifier (partner DID) associated with the partner institution;
        identify a blockchain based at least in part on the partner DID;
        determine user data from the blockchain based at least in part on the user DID; and
        send the user data to a processing service.

2. The system of claim 1, wherein the machine-readable instructions, when executed, further cause the computing device to at least:
    send a registration prompt based at least in part on the identifier;
    receive a registration request to register the user based at least in part on the registration prompt; and
    in response to receiving the registration request, determine user data from the blockchain.

3. The system of claim 2, wherein the machine-readable instructions that cause the computing device to send a registration prompt, when executed, further cause the computing device to at least:
    identify a program based at least in part on the identifier;
    generate a registration prompt based at least in part on the program; and
    send the registration prompt to a user device associated with the user.

4. The system of claim 3, wherein the machine-readable instructions, when executed, further cause the computing device to at least:
    compare the user data determined from the blockchain to data requirements of the program;
    identify a plurality of missing data elements;
    generate a prompt for the plurality of missing data elements; and
    send the prompt to the user device.

5. The system of claim 1, wherein the machine-readable instructions that receive an identifier, when executed, further cause the computing device to at least:
    receive an action record associated with an action between the user and the partner institution; and
    determine the identifier based at least in part on the action record.

6. The system of claim 1, wherein the machine-readable instructions, when executed, further cause the computing device to at least verify the user associated with the user DID.

7. The system of claim 1, wherein the machine-readable instructions that cause the computing device to identify the blockchain based at least in part on the partner DID, when executed, further cause the computing device to at least:
    determine a peer partner DID associated with the partner DID; and
    select the blockchain based at least in part on the peer partner DID.

8. A method, comprising:
    receiving, by a computing device, an identifier associated with a user and a partner institution;

obtaining, by the computing device and based at least in part on the identifier, at least a user decentralized identifier (user DID) associated with the user and a partner decentralized identifier (partner DID) associated with the partner institution;

identifying, by the computing device, a blockchain based at least in part on the partner DID;

determining, by the computing device, user data from the blockchain based at least in part on the user DID; and sending, by the computing device, the user data to a processing service.

9. The method of claim 8, further comprising:

sending, by the computing device, a registration prompt based at least in part on the identifier;

receiving, by the computing device, a registration request to register the user based at least in part on the registration prompt; and in response to receiving the registration request, determining, by the computing device, user data from the blockchain.

10. The method of claim 9, wherein sending a registration prompt further comprises:

identifying, by the computing device, a program based at least in part on the identifier;

generating, by the computing device, a registration prompt based at least in part on the program; and sending, by the computing device, the registration prompt to a user device associated with the user.

11. The method of claim 10, further comprising:

comparing, by the computing device, the user data determined from the blockchain to data requirements of the program;

identifying, by the computing device, a plurality of missing data elements;

generating, by the computing device, a prompt for the plurality of missing data elements; and sending, by the computing device, the prompt to the user device.

12. The method of claim 8, wherein receiving an identifier, further comprises:

receiving, by the computing device, an action record associated with an action between the user and the partner institution; and determining, by the computing device, the identifier based at least in part on the action record.

13. The method of claim 8, further comprising verifying the user associated with the user DID.

14. The method of claim 8, wherein identifying the blockchain based at least in part on the partner DID further comprises:

determining, by the computing device, a peer partner DID associated with the partner DID; and selecting, by the computing device, the blockchain based at least in part on the peer partner DID.

15. A non-transitory, computer-readable medium, comprising machine-readable instructions that, when executed by a processor of a computing device, cause the computing device to at least:

receive a registration request to register a user, the registration request comprising at least a user decentralized identifier (user DID) associated with the user;

obtain a partner decentralized identifier (partner DID) associated with a partner institution, based at least in part on the registration request;

determine user data from a blockchain based at least in part on the user DID, the blockchain being associated with the partner DID; and complete registration of the user based at least in part on the user data.

16. The non-transitory, computer-readable medium of claim 15, wherein the machine-readable instructions, when executed by the processor, further cause the computing device to at least:

receive an identifier associated with the user and the partner institution;

generate a registration prompt based at least in part on the identifier; and send the registration prompt to a user device associated with the user.

17. The non-transitory, computer-readable medium of claim 16, wherein the machine-readable instructions, when executed by the processor, cause the computing device to at least:

receive an action record associated with an action between the user and the partner institution; and determine the identifier based at least in part on the action record.

18. The non-transitory, computer-readable medium of claim 16, wherein the machine-readable instructions, when executed by the processor, further cause the computing device to at least:

compare the user data to a plurality of data requirements of a program associated with the registration prompt;

identify a plurality of missing data elements;

generate a prompt for the plurality of missing data elements; and send the prompt to the user device.

19. The non-transitory, computer-readable medium of claim 15, wherein the machine-readable instructions that cause the computing device to complete registration of the user when executed by the processor, further cause the computing device to at least:

send the user data to a processing service;

receive confirmation of registration; and send a registration notification to a user device associated with the user.

20. The non-transitory, computer-readable medium of claim 15, wherein the machine-readable instructions, when executed by the processor, further cause the computing device to at least verify the user.

* * * * *